3,793,321
PROCESS FOR THE MANUFACTURE OF
TRIGLYCIDYLISOCYANURATE
Juergen Habermeier, Pfeffingen, Hans Batzer, Arlesheim, and Daniel Porret, Binningen, Switzerland, assignors to Ciba-Geigy AG, Basel, Switzerland
No Drawing. Filed June 29, 1971, Ser. No. 158,110
Claims priority, application Switzerland, July 2, 1970, 10,043/70
Int. Cl. C07d 55/38
U.S. Cl. 260—248 NS                    8 Claims

ABSTRACT OF THE DISCLOSURE

Manufacture of triglycidylisocyanurate (TGIC) by epoxidation of triallylisocyanurate with $H_2O_2$+nitrile, such as benzonitrile. The TGIC manufactured according to the new process has the advantage over conventional TGIC, obtained by reaction of epichlorohydrin with cyanuric acid, of substantially improved storage stability.

Triglycidylisocyanurate is a known compound. It can be cured by means of the customary curing agents for epoxide resins, such as polycarboxylic anhydrides or polyamines to give mouldings which find diverse uses in commerce and industry.

---

The industrial manufacture of triglycidylisocyanurate has hitherto been effected by reaction of cyanuric acid with epichlorohydrin. Numerous variants of this process are described in the patent literature (compare, for example, U.S.A. patent specification 2,809,942, British patent specification 996,723 and French patent specification 1,570,826). By these processes, crystalline triglycidylisocyanurate with over 14% of epoxide oxygen (theory: 16.1% of epoxide oxygen) can be manufactured. The storage stability of these commercially available conventional types of crystalline triglycidylisocyanurate is however unsatisfactory; after prolonged storage, not only does an undesirable turbidity manifest itself, but the reactivity of the resin increases so greatly that after mixing with the curing agent the pot-life becomes so short that processing, for example in casting, is no longer possible, or only possible with difficulties.

Investigations have shown that this relatively poor storage stability, above all the rise in the reactivity and hence the shortening of the pot-life, after prolonged storage, is due to basic impurities (amines, amides and ureas), which are produced during the dehydrohalogenation stage in the manufacturing process. While part of these impurities can be removed by washing, and the stability hence improved, complete removal is not possible without uneconomically high expenditure.

It has also already been proposed to treat triallylisocyanurate with per-acids, (compare British patent specification 941,507). Using this process, however, it is possible to epoxidize at most two of the total of three allyl groups in the molecule of the triallylisocyanurate, so that mixtures of monoglycidyl and diglycidyl derivatives of isocyanuric acid are produced which still contain allyl groups.

It has now been found that the epoxidation of triallylisocyanurate to give triglycidylisocyanurate can be carried out in good yield and economically, if the epoxidation is carried out with hydrogen peroxide and a nitrile.

Surprisingly, the triglycidylisocyanurate manufactured according to this process has a higher storage stability than the commercially available triglycidylisocyanurate manufactured from epichlorohydrin and cyanuric acid. In particular, the resin shows no undesirably pronounced increase in reactivity even after prolonged storage, as is the case with conventional commercially available triglycidylisocyanurate.

The epoxidation of olefinically unsaturated compounds with nitrile and hydrogen peroxide has already been described in the literature (compare U.S.A. patent specification 3,053,856 and the investigations by Y. Ogata and Y. Sawaki, published in "Tetrahedron" 1964 (volume 20) 2065–2068). However, this method has hitherto not been proposed for the epoxidation of triallylisocyanurate.

It was entirely unexpected to an expert that according to this method it is possible to manufacture triglycidylisocyanurate which is free even of traces of undesired decomposition products and has a substantially improved storage stabiliy.

The subject of the present invention is hence a process for the manufacture of triglycidylisocyanurate, characterized in that triallylisocyanurate is epoxidized, at a pH of at least 4, with a mixture of hydrogen peroxide and a nitrile of the formula R—C≡N, or a peroxycarboximide-acid of the formula

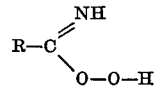

wherein R denotes either an organic acyclic radical or an organic cyclic radical which possesses no other unsaturation than double bonds present in an aromatic ring. When using a mixture of $H_2O_2$ and nitrile of the formula R—C≡N, the peroxycarboximid-acid of the formula

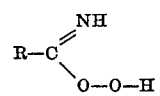

is presumably formed in situ.

The triallylisocyanurate used as the starting compound is a known compound which can for example be manufactured from cyanuric acid via trisodium cyanurate by reaction with allyl chloride. Another possible method of manufacture is the isomerization of triallylcyanurate which is manufactured from cyanuric chloride and allyl alcohol.

As suitable nitriles for the process according to the invention, there may, for example, be mentioned: acetonitrile, adiponitrile, 1,3-di(cyanoethyl)-5,5-dimethylhydantoin, glycollic and nitrile or aromatic nitriles such as phthalonitrile or especially benzonitrile.

The preferred reaction conditions are as follows: the temperature should lie in the range between 15° and 60° C., and the pH (glass electrode) should be 8.5–10.0. Per mol of C=C double bond to be epoxidized, it is preferred to use 1.0–1.3 mols of nitrile and 1.1–1.4 mols of $H_2O_2$, and, as the solvent, 300–1500 ml. of methanol. Furthermore, 0.5–5 g. of $Na_2HPO_4$ are preferably added as the buffer per mol of S=C double bond.

The amide, formed from the nitrile, which is obtained can be removed by extraction or by filtration. The triglycidylisocyanurate obtained as a crystal slurry can be purified by recrystallization.

In commercially available triglycidylisocyanurate manufactured from cyanuric acid and epichlorohydrin, two stereoisomers can be detected, a low melting α-form (melting point: 103–105° C.) and a higher-melting β-form (melting point: 156–158° C.), which occur in an approximately statistical ratio (compare M. Budnowski "Agnew. Chemie" 8° (1968), 851–852).

These stereoisomers were also detectable in the triglycidylisocyanurate manufactured according to the invention by epoxidation of triallylisocyanurate, but the weight ratio of α-form:β-form is approximately 10:1 to 12:1.

The triglycidylisocyanurate manufactured according to the process of the invention is particularly suitable for those applications where even after prolonged storage of the resin, a sufficiently long pot-life is demanded of the resin-curing agent mixture; this is above all the case in the casting resin field.

In the examples which follow, parts denote parts by weight and percentages denote percentages by weight.

EXAMPLE 1

312 g. (=1.25 mols) of 1,3,5-triallylisocyanurate (boiling point$_{0.2-0.3}$=120–125° C.), 2300 ml. of methanol, 3.55 g. of disodium hydrogen phosphate, 485 g. of benzonitrile (4.7 mols) and 220 g. of a 35% strength aqueous hydrogen peroxide solution are introduced into a flask equipped with a stirrer, thermometer, reflux condenser, dropping funnel and pH electrode. The dropping funnel is filled with 0.5 N aqueous sodium hydroxide solution. The reaction mixture is now brought to 50° C. while stirring, and a pH of 9.5 is established, and maintained, by means of the sodium hydroxide solution. The reaction is slightly exothermic, so that the heating bath can be removed. After one hour, a further 110 g. of a 35% strength aqueous hydrogen peroxide solution are added, and the temperature is kept at 50° C. and the pH at 9.5. After a further hour, a last portion of 35% strength hydrogen peroxide solution (105 g.) is added, and the mixture is allowed to react under the abovementioned conditions until the conttent of active oxygen, calculated as $H_2O_2$, has dropped to 0.85% (iodometric titration). The reaction in total lasts 5½ hours. The reaction mixture is now treated with 2.3 litres of water and is extracted by shaking 3 times with 1 litre of chloroform at a time. The chloroform phase is concentrated to ⅓, mixed with 200 ml. of petroleum ether and cooled to 0° C. The benzamide which precipitates is filtered off. Thereafter, the clear solution is completely concentrated on a rotary evaporator at 70° C. under a waterpump vacuum. Thereafter, the product is dried to constant weight at 70° C./0.2 mm. Hg. 317 g. of a yellowish crystal mass (100% of theory) are obtained. The epoxide content of the crude product is 7.12 epoxide equivalents/kg. To remove the last traces of nitrile and other impurities, the product is triturated with 100 ml. of methanol. A crude triglycidylisocyanurate with 9.0 epoxide equivalents/kg. (89% of theory) is obtained in about 70% yield. This crude product melts at 90–110° C. The proton-magnetic resonance spectrum (60-mc. H-NMR, recorded in deuterochloroform at 37° C., with tetramethylsilane as the internal standard) shows that the crude product with 9.0 epoxide equivalents essentially consists of 1,3,5-triglycidylisocyanurate:

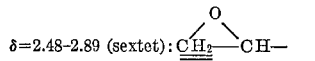

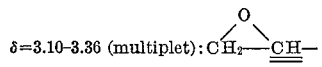

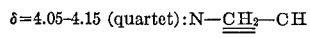

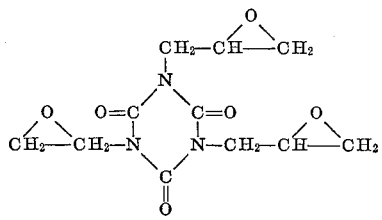

The H-NMR spectrum further shows that the product still possesses traces of N-allyl groups (weak CH=C signals at δ=5.2–5.7).

The product can be purified by recrystallization from alcohols. A separation of the isomer mixture can also be achieved at the same time.

20 g. of the crude product with 9.0 epoxide equivalents are warmed with 80 g. of methanol. The insoluble residue is recrystallized from acetone. 1.2 g. of the β-form (6.0% of the amount employed) of melting point=154–157° C. are thus obtained, having an epoxide content of 10.1 equivalents/kg. (100% of theory). 14.8 g. of the α-form (74% of the amount employed), of melting point=97–100° C., with an epoxide content of 9.62 equivalents/kg. (95.4% of theory) crystallize at room temperature from the methanol solution.

A further 3 g. (15% of the amount employed) of a product having the following characteristics can additionally be crystallized from the mother liquor: melting point=55–60° C.; epoxide content=8.39 equivalents/kg. (83% of theory). This fraction still contains allyl groupings.

EXAMPLE 2

Analogously to Example 1 249 g. of triallylisocyanurate (1.0 mol) in 1.84 l. of methanol are epoxidized at 50° C. and pH=9.5 with 154.4 g. of technical acetonitrile (3.76 mols) and 176 g. of 35% strength hydrogen peroxide, with the aid of 2.84 g. of disodium hydrogen phosphate. The further hydrogen peroxide additions (35% strength) consist of 88.0 g. added after one hour, and 84.0 g. added after a further hour. In total, 3.58 mols of hydrogen peroxide are thus used.

The reaction procedure, and the end point determination, are carried out analogously to Example 1. 435 g. of 0.5 N NaOH are required to maintain the pH. A total of 24 hours are required until the peroxide content of the solution has dropped to 0.4%.

Working up takes place as described in Example 1. In the course thereof, however, the acetamide formed remains dissolved in the aqueous phase.

After concentration and drying, 197.2 g. of a substance which crystallizes (66.4% of theory) are obtained, having an epoxide content of 6.1 equivalents/kg. (59.6% of theory).

The crude product is purified by stirring with 200 ml. of methanol at 50° C., and after cooling, the colorless crystals are filtered off; after drying, they weigh 111 g. The melting point is 59.1° C. ("Mettler FP 51" automatic apparatus). The epoxide content is 6.9 g. equivalents/kg. (68.2% of theory). The proton-magnetic resonance spectrum shows that 59% of N-glycidyl groups and 41% of N-allyl groups are present. Accordingly, the product is a mixture of triglycidylisocyanurate, diglycidylmonoallylisocyanurate and diallylmonoglycidylisocyanurate.

Comparison of the properties of triglycidylisocyanurate manufactured from triallylisocyanurate according to the invention (TGIC I) and a conventional triglycidylisocyanurate manufactured by reaction of cyanuric acid and epichlorohydrin (TGIC II):

(A) Storage stability (a) Samples of the crude triglycidylisocyanurate manufactured according to Example 1 (TGIC I), with an epoxide content of 9.0 epoxide equivalents/kg., are stored for 16 and 40 days at room temperature (25° C.), and in a first series of tests the influence of the storage time on the viscosity of a sample warmed to 120° C., as well as on the viscosity increase after 24 hours' heating to 120° C., is determined.

In a second test series, the influence of the storage time on the reactivity is investigated by producing a casting resin sample by homogeneously mixing 1 epoxide equivalent of TGIC I with 0.85 mol of hexahydrophthalic anhydride, and determining its pot-life at 120° C. (=time in minutes, by which the viscosity of the mixture at 120° C. reaches a value of 1,500 cp).

(b) Analogously to (a), a triglycidylisocyanurate manufactured according to the process of French patent specification 1,570,825 (TGIC II), with an epoxide content of 9.5 epoxide equivalents/kg., which has been washed with 5% strength aqueous sulphuric acid in order to remove basic impurities, is stored, and the viscosity change as well as the decrease in the pot-life of a casting resin sample, the composition of which is other analogous to that under (a), is subsequently determined.

The results are summarized in the table which follows:

TABLE

|  | (a) Sample with TGIC I | | | (b) Comparison sample with TGIC II | | |
| --- | --- | --- | --- | --- | --- | --- |
| Storage at room temperature (days) | 0 | 16 | 40 | 0 | 16 | 40 |
| Viscosity at 120° C. in cp | 50 | 35 | 35 | 60 | 60 | 55 |
| Viscosity increase after 24 hours at 120° C., in percent | | 0 | 0 | | 41.7 | 36.4 |
| Pot-life of the mixture of TGIC plus hexahydrophthalic anhydride at 120° C., up to 1,500 cp., in minutes | 305 | 273 | 238 | 217 | 98 | 68 |
| Decrease in pot-life, in percent | | 11 | 22 | | 55 | 69 |

(B) Gelling times of casting resin mixtures (a) 3.0 g. of a homogeneous mixture of crude triglycidylisocyanurate manufactured according to Example 1 (TGIC I) with an epoxide content of 9.0 equivalents per kg., and hexahydrophthalic anhydride (0.85 mol per epoxide group) as the curing agent, are introduced into a glass vessel in a thermostatic heating bath at 80° C., and the gel time was determined. Gelling did not yet occur over the course of 1440 minutes at 80° C.; the bath temperature was therefore raised to 120° C.; gelling then occurred within 180 minutes.

(b) Analogously to the description under (a), the gelling time of a homogeneous mixture of hexahydrophthalic anhydride and a triglycidylisocyanurate (TGIC II) manufactured according to the process of French patent specification 1,570,826, reaction of cyanuric acid with epichlorohydrin, is determined in a comparison experiment.

The sample had gelled after 70 minutes at 80° C. The triglycidylisocyanurate manufactured according to the invention hence has a much longer pot-life.

TGIC I (according to the invention): gelling time with hexahydrophthalic anhydride is 1440 minutes/80° C.+180 minutes/120° C.

TGIC II (commercially available): gelling time with hexahydrophthalic anhydride is 70 minutes/80° C.

(C) Properties of mouldings

The following casting resin mixtures (a) and (b) were manufactured by homogeneous mixing of the components at 80° C., cast into aluminium moulds of 4 mm. wall thickness and then uniformly cured for 3 hours at 80° C.+16 hours at 140° C:

(a) 380 parts of the triglycidylisocyanurate manufactured according to Example 1 (TGIC I) with 9.0 epoxide equivalents/kg., +513 parts of hexahydrophthalic anhydride.

(b) 100 parts of a triglycidylisocyanurate manufactured according to French patent specification 1,570,826, with 9.3 epoxide equivalents per kg., +128 parts of hexahydrophthalic anhydride.

For testing the aging resistance and the water resistance, the mouldings obtained were subsequently stored for a further 7 days at 200° C. and thereafter still placed in water (25° C.) for 72 hours. The mouldings aged in this way show the following mechanical and electrical properties:

|  | (a) Sample with TGIC I | (b) Comparison sample with TGIC II |
| --- | --- | --- |
| Flexural strength (VSM), kp./mm.$^2$ | 9.8 | 9.0 |
| Deflection (VSM), mm | 4.8 | 3.8 |
| Tracking resistance (VDE), level | KA3$_c$ | KA3$_c$ |
| Glass transition temperature, measured before the storage in water (° C.) | 249 | 242 |

What is claimed is:

1. A process for the preparation of a sterioisomeric mixture of triglycidylisocyanurate, said mixture containing by weight the α and β-form in the ratio of from 10:1 to 12:1 which process is characterized in that triallylisocyanurate is epoxidized at a pH of at least 4 with a mixture of hydrogen peroxide and a nitrile selected from the group consisting of acetonitrile, adiponitrile, 1,3-di(cyanoethyl)-5,5-dimethylhydantoin, phthalonitrile or benzonitrile.

2. Process according to claim 1, characterized in that benzonitrile is used as the nitrile.

3. Process according to claim 1, characterized in that the epoxidation is carried out in the temperature range of 15–60° C.

4. Process according to claim 1, characterized in that the epoxidation is carried out in the pH range of 8.5 to 10.0.

5. Process according to claim 1, characterized in that 1.0–1.3 mols of nitrile and 1.1 to 1.4 mols of hydrogen peroxide are employed per mol of C=C double bond of the triallylisocyanurate.

6. Process according to claim 1, characterized in that 300–1500 ml. of methanol are employed as the solvent per mol of C=C double bond of the triallylisocyanurate.

7. Process according to claim 1, characterized in that Na$_2$HPO$_4$ is added as a buffer substance.

8. Process according to claim 7, characterized in that 0.5 to 5.0 g. of Na$_2$HPO$_4$ are used per mol of C=C double bond of the triallylisocyanurate.

References Cited

UNITED STATES PATENTS 3,053,856    9/1962    Payne et al. _____ 260—348.5

FOREIGN PATENTS 941,507    11/1963    Great Britain _____ 260—248

OTHER REFERENCES

Ogata et al.: Tetrahedron, 1964, vol. 20, pp. 2065–8.

JOHN FORD, Primary Examiner